United States Patent [19]
Titus et al.

[11] Patent Number: 5,761,456
[45] Date of Patent: Jun. 2, 1998

[54] PROCESSOR DEVICE HAVING AUTOMATIC BUS SIZING

[75] Inventors: Scott Duane Titus, Round Rock, Tex.; Kreg A. Martin, Cupertino; Stephen K. Will, Sunnyvale, both of Calif.

[73] Assignee: Trimble Navigation Limited, Sunnyvale, Calif.

[21] Appl. No.: 627,952

[22] Filed: Apr. 3, 1996

[51] Int. Cl.[6] .................................................. G06F 13/00
[52] U.S. Cl. .................... 395/307; 395/325; 395/500; 364/578; 364/443; 364/579
[58] Field of Search ...................................... 395/307, 325, 395/500, 183.21, 292, 280, 829; 364/578, 443, 579, 489; 342/357

[56] References Cited

U.S. PATENT DOCUMENTS

| | | | |
|---|---|---|---|
| 5,329,471 | 7/1994 | Swoboda et al. | 364/578 |
| 5,379,382 | 1/1995 | Work et al. | 395/275 |
| 5,388,060 | 2/1995 | Adams, Jr. et al. | 364/579 |
| 5,423,009 | 6/1995 | Zhu | 395/325 |
| 5,438,672 | 8/1995 | Dey | 395/500 |
| 5,504,684 | 4/1996 | Lau et al. | 364/443 |
| 5,592,173 | 1/1997 | Lau et al. | 342/357 |
| 5,594,874 | 1/1997 | Narayanan et al. | 395/284 |

*Primary Examiner*—Ayaz R. Sheikh
*Assistant Examiner*—Eric Thlang
*Attorney, Agent, or Firm*—David R. Gildea

[57] ABSTRACT

A processor device and method for booting a programmable apparatus having a signal bus having a selectable bus width. The processor device includes a microprocessor, a configurable bus interface for coupling the microprocessor to the signal bus, and a first memory. The first memory includes a bus sizing code for instructing the microprocessor for reading initial data from a pre-determined address of a second memory and configuring the bus interface to the bus width that has been selected. The first memory further includes a checksum code for a self-test of the memory, an emulator detect code for skipping the checksum code when control of the microprocessor is transferred to an emulator, a delay code for delaying a start of operation of the programmable apparatus when circuits in the programmable apparatus have a restrictive voltage requirement, and a monitor request code for transferring control to a monitor code when requested by an external user or when a self-test fails.

11 Claims, 2 Drawing Sheets

PROCESSOR DEVICE HAVING AUTOMATIC BUS SIZING

BACKGROUND OF THE INVENTION

1. Field of the Invention

The invention relates generally to a processor device and method for use in booting a programmable apparatus and more particularly to a processor device and method for configuring to a selectable signal bus width, automatically detecting the presence of an emulator, delaying power turn on for a power source having a slow rise time, and direct entry to an internal monitor for viewing and changing program code.

2. Description of the Prior Art

Electronic products today are commonly controlled by a microprocessor-based processor device including the microprocessor, an internal memory including low-level program code, and bus interface hardware. In these products, the processor device communicates over a signal bus to various associated circuits in the product including an external memory for storing application program code, circuits that are specific for the application of the product, and input/output hardware for communicating with a user. When the product is switched on, the processor device operates with program code in either the internal or external memory to perform an operation called boot-up to activate itself and the associated circuits. Typically, the boot-up includes self-tests such as a checksum test on the memories. When the boot-up is completed, the product begins its application.

The cost of a powerful, general purpose microprocessor has now decreased to the point where it is cost efficient to use a single species of a general purpose microprocessor in the processor device in many different products even when the different products have greatly differing performances and prices. Further, such general usage improves engineering efficiency by enabling an engineer or engineering team to develop many differing products while using the same development tools, same experience base, and much of the same software across the products. However, a limitation of this tactic is that a lower cost product will typically have a smaller bus width than a higher performance product. Bus widths of four, eight, sixteen, thirty-two, sixty-four, and others are in common use today. Existing products solve this problem by using different hardware and/or software for each different bus width. Unfortunately, this solution results in a less general processor device.

One of the tools used for developing these electronic products is an emulator. The emulator includes an emulator code used as a substitute for the program code in the external memory in order to facilitate making and testing changes while the product is being developed or improved. Program code typically includes a checksum code for testing that the program code is stored correctly in the external memory. One difficulty in changing the program code or emulator code is that a new checksum must be determined each time a change is made. This can be time consuming when the program code is being changed often as is sometimes the case when an emulator is in use. Existing systems solve this problem by deleting or ignoring the checksum test while program changes are being evaluated in the emulator and then reinstating the test when the changes are completed. This solution may be inconvenient and may lead to unexpected results when the final program code replaces the final emulator code.

SUMMARY OF THE INVENTION

It is therefore an object of the present invention to provide a processor device that automatically configures at boot-up to a selected bus width of a signal bus.

Another object of the present invention is to provide a processor device that automatically eliminates a checksum test of the memory when a memory is replaced by an emulator.

Another object of the present invention is to provide a processor device having a capability of delaying the completion of boot-up after a source of operating power is turned on.

Another object of the present invention is to provide a processor device that transfers control to a monitor code when requested by an external user or when a self-test fails.

Another object of the present invention is to provide a processor device that is capable of configuring to a selected bus width of a signal bus in a global positioning system (GPS) receiver.

Briefly, in a preferred embodiment, the processor device of the present invention includes a microprocessor, a first memory, and a configurable bus interface for coupling the microprocessor to a signal bus having a selected bus width in a programmable apparatus having a second memory. The first memory includes a bus sizing code for instructing the microprocessor for reading initial data including information indicative of the selected bus width from the second memory and configuring the bus interface to read and write on the signal bus. The first memory further includes a checksum code, for a self-test of the first and/or second memory, an emulator detect code for transferring control of the microprocessor to an emulator while skipping a checksum code, a delay code for delaying the completion of boot-up of the programmable apparatus, and a monitor request code for transferring control of the microprocessor to a monitor code.

An advantage of the processor device of the present invention is that it automatically configures to a selected bus width at boot-up, thereby enabling a single design of a processor device to control a programmable apparatus having a signal bus having a selected bus width.

Another advantage of the processor device of the present invention is that it eliminates a checksum test of a memory when the memory is replaced by an emulator, thereby eliminating the need to manually override a checksum error or revise the checksum each time that program code is modified in the emulator.

Another advantage of the processor device of the present invention is that it has a capability for delaying boot-up of a programmable apparatus to compensate for a slow rise time of a source of operating power and/or restrictive voltage requirements for the programmable apparatus.

Another advantage of the processor device of the present invention is that it transfers control to a monitor code at boot-up to facilitate troubleshooting a programmable apparatus.

Another advantage of the processor device of the present invention is that it is capable of configuring to a selected bus width of a signal bus in a global positioning system (GPS) receiver, thereby allowing the processor device to be used to control either a low cost GPS receiver having a small bus width or a high performance GPS receiver having a large bus width.

These and other objects and advantages of the present invention will no doubt become obvious to those of ordinary skill in the art after having read the following detailed description of the preferred embodiments which are illustrated in the various figures.

IN THE DRAWINGS

FIG. 1 is a block diagram of a programmable apparatus including a processor device of the present invention; and FIG. 2 is a flow chart of a method using the processor device of FIG. 1 for booting the programmable apparatus of FIG. 1.

DETAILED DESCRIPTION OF THE PREFERRED EMBODIMENTS

Figure 1:
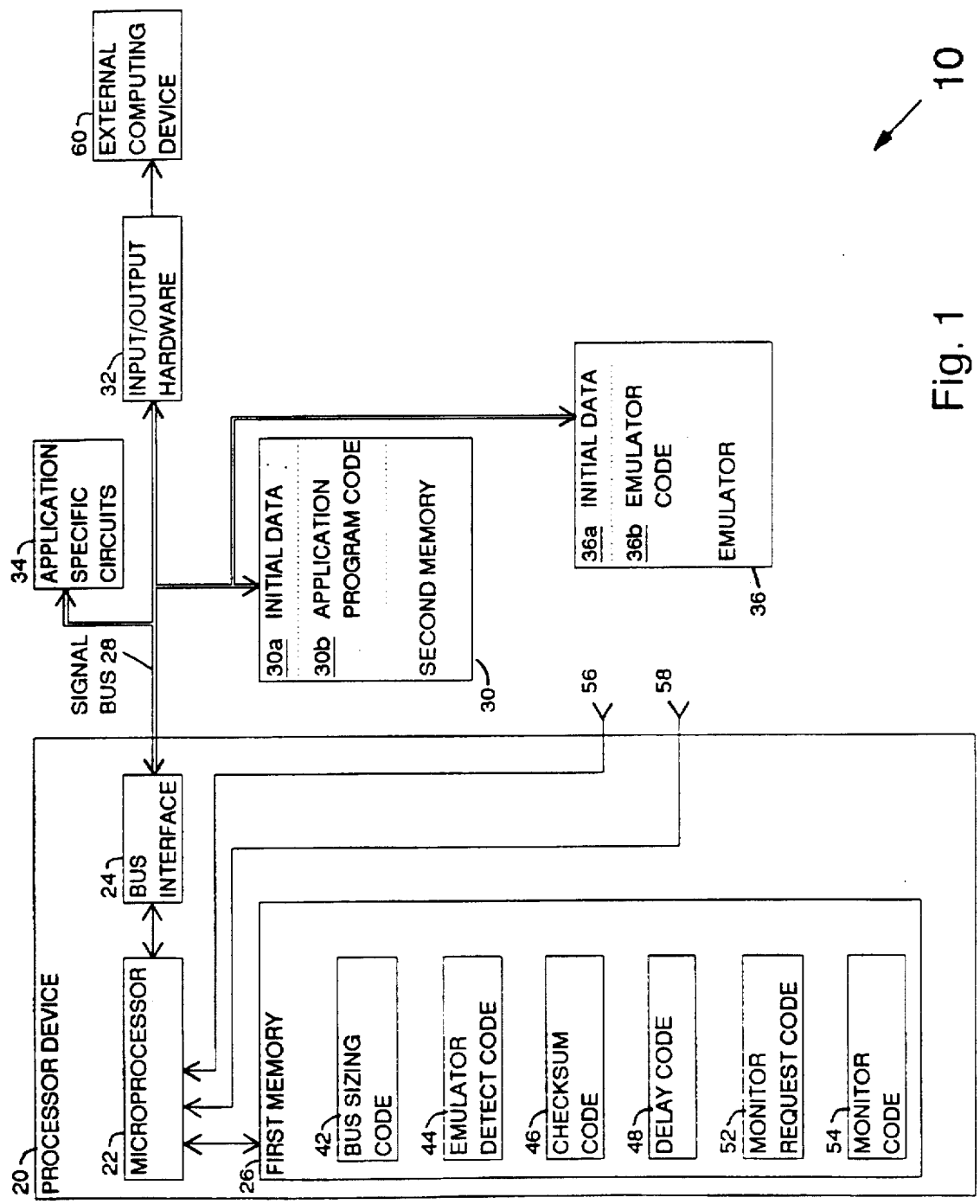

FIG. 1 illustrates a block diagram of a programmable apparatus of the present invention and referred to by the general reference number 10. The programmable apparatus 10 includes a processor device 20 including a microprocessor 22, a configurable bus interface 24, and a first memory 26. In a preferred embodiment, the processor device 20 is disposed on a single silicon chip. At turn on the first memory 26 controls the operation of the microprocessor 22 for communicating through the bus interface 24 to a signal bus 28 having a selectable bus width. The signal bus 28 may carry data and addresses serially or in parallel.

The signal bus 28 connects the bus interface 24 to a second memory 30, including one or more memory devices, input/output hardware 32, and application specific circuits 34. The second memory 30 includes an application program code 30b including an executable program and data for running an intended application of the programmable apparatus 10. An exemplary programmable apparatus 10 is a global positioning system (GPS) receiver for receiving a GPS satellite signal and providing a GPS-derived location. The application specific circuits 34 for the GPS receiver include the circuits for downconverting and correlating the GPS satellite signal to an internally generated replica signal. A low cost GPS receiver, such as a GPS engine for OEM sales or an handheld GPS receiver, may use a signal bus 28 having a bus width of eight bits. A high performance GPS receiver, such as a Surveyor, may use a signal bus 28 having a bus width of sixteen or thirty-two bits and may have separate data and address buses.

The first memory 26 and the second memory 30 are organized for storing words of digital information at addresses. The words include an arbitrary number of bits, preferably eight or sixteen, that are used as data or executable instructions by the microprocessor 22. The memory devices of the first and second memory 26 and 30 may include one or a combination of the conventional memory types used in computers and computer-like apparatus such as a flash memory, random access memory (RAM), static RAM (SRAM), dynamic RAM (DRAM), read only memory (ROM), mask ROM, one time programmable ROM (OTP), programmable ROM (PROM), erasable PROM (EPROM), electrically erasable PROM (EEPROM), programmable array logic (PAL), programmable logic array (PLA), programmable logic device (PLD), electrically programmable logic device (EPLD), and field programmable gate array (FPGA). For developing and troubleshooting the programmable apparatus, one or more memory devices may be replaced by memory in an emulator 36. The first memory 26 and the second memory 30 may be separate or may be physically the same memory chip.

The second memory 30 and the emulator 36 are programmed to have one or more words of initial data 30a and 36a, respectively, beginning at a pre-determined initial address. The initial data 30a and 36a includes data bits representative of a bus width that has been selected for the signal bus 28 and an emulation flag for indicating when the second memory 30 is actually the emulator 36. The first memory 26 includes a bus sizing code 42 for instructing the microprocessor 22 for reading the initial data 30a or 36a through the bus interface 24 and the signal bus 28 and configuring the bus interface 24 according to the selected bus width. When the emulator flag is not asserted, an emulator detect code 44 transfers control of the microprocessor 22 to a checksum code 46. The checksum code 46 instructs the microprocessor 22 for performing a checksum test on part or all of the first memory 26 and/or second memory 30 after first reading a checksum and an address space specified by data within the second memory 30. When the emulator flag is asserted, the emulator code 44 transfers control of the microprocessor 22 to an emulator code 36b starting at a pre-determined emulator address in the emulator 36 that emulates the application program code 30b. The emulator 36 may then be used for simulating changes in code in the first memory 26 and/or second memory 30 without physically changing the first memory 26 and/or the second memory 30.

The first memory 26 optionally includes a delay code 48, a monitor request code 52, and a monitor code 54. The delay code 48 instructs the microprocessor 22 to read a delay flag at a first electrical connection 56. The delay flag is asserted when a power source that supplies the programmable apparatus 10 has a slow or delayed rise time or a circuit in the programmable apparatus 10 has a more restrictive voltage requirement than the processor device 20. In a preferred embodiment, when the delay flag is asserted, the delay code 48 is a software loop for looping a pre-determined number of times to retain control of the microprocessor 22 for a pre-determined time in order to allow the power source voltage sufficient time to reach a voltage that is sufficient for operating the programmable apparatus 10. Alternatively, the delay code 48 continues to test the delay flag to retain control of the microprocessor 22 until the delay flag is unasserted.

The request monitor code 52 instructs the microprocessor 22 to read a monitor request flag at a second electrical connection 58. The monitor request flag is asserted in the programmable apparatus 10 when an external user requests access to the first memory 26 and/or the second memory 30. When the monitor request flag is asserted, the monitor request code 52 transfers control of the microprocessor 22 to the monitor code 54. The monitor code 54 instructs the microprocessor 22 for enabling the external user to read and/or write in the first memory 26 and/or the second memory 30 through the input/output hardware 32. Typically, the external user uses an external computing device 60 to communicate data that is read or written.

Figure 2:
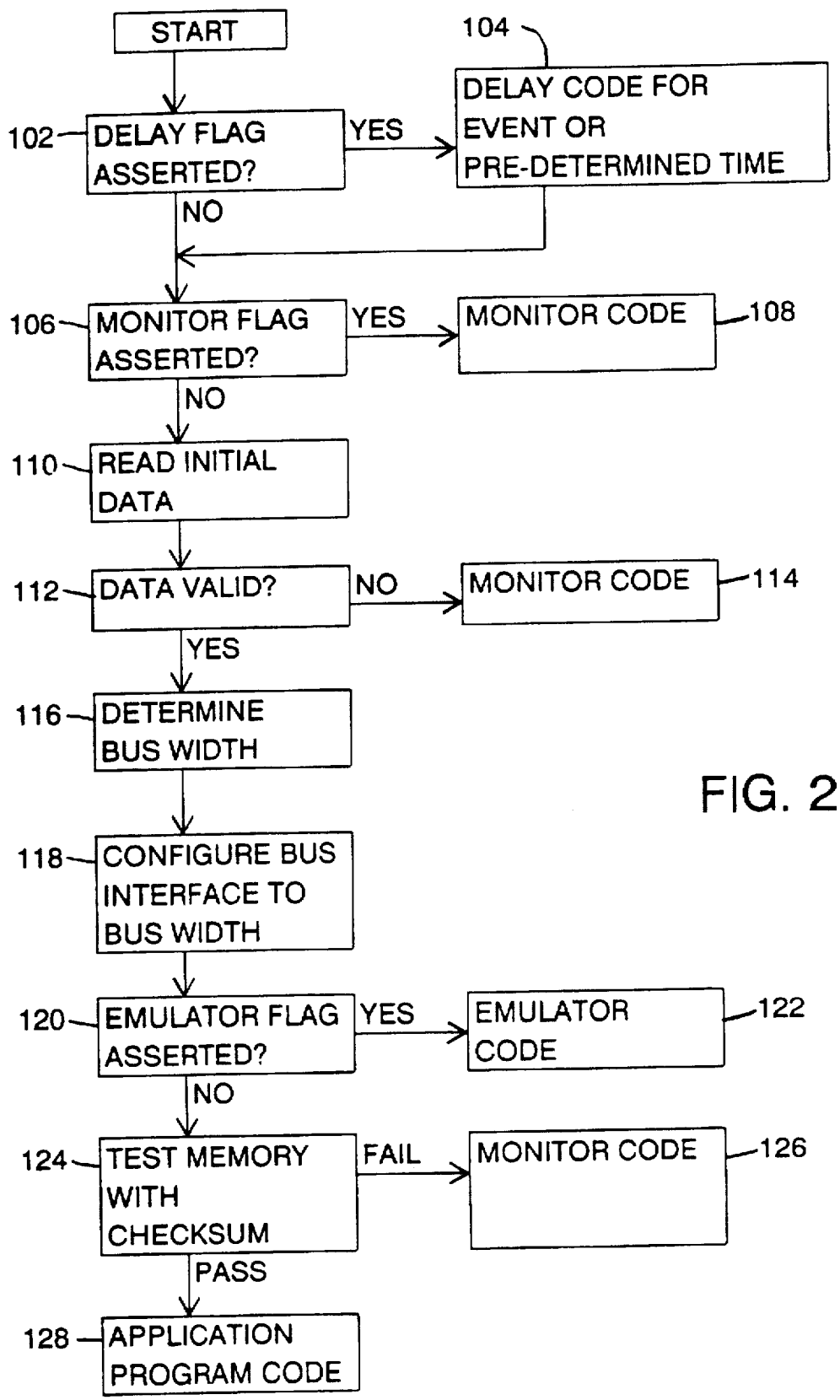

FIG. 2 illustrates flow chart of a method used when booting the programmable apparatus 10. At the start, the second memory 30 (FIG. 1) and/or emulator 36 includes initial data 30a and/or 36a, respectively, including information for the bus width and the emulator flag at the pre-determined first address. At a step 102 the delay code 48 instructs the microprocessor 22 to test the delay flag at the first electrical connection 56. At a step 104, when the delay flag is asserted, the delay code 48 retains control of the microprocessor 22 for a pre-determined time. Alternatively, the delay code 48 continues to test the delay flag until the delay flag is not asserted. At a step 106, after the predetermined time or if the delay flag is not asserted, control passes to a monitor request code 52 that instructs the microprocessor 22 to test the monitor request flag at the second electrical connection 58. At a step 108, when the monitor flag is asserted, control passes to the monitor code 54 for reading and writing to the first memory 26 and/or the second memory 30.

In a step 110, when the monitor request flag is not asserted, control passes to a bus sizing code 42 to instruct the microprocessor 22 to access the initial data 30a or 36a at the pre-determined initial address of the second memory 30 or the emulator 36, respectively. In a preferred embodiment, the specifications for accessing the initial data 30a or 36a are an address of zero and the initial access is eight bits, three wait states at a clock frequency of eight megahertz. Of course, those skilled in the art will understand that various other pre-determined specifications may be used. At a step 112 the bus sizing code 42 performs a self-test to determine whether or not the initial data 30a or 36a is valid. At a step 114, when the initial data 30a or 36a is not valid, control passes to the monitor code 54 and the external user is notified of an error condition. At a step 116, when the initial data 30a or 36a is valid, the bus sizing code 42 determines the bus width that has been selected for the signal bus 28 in the design of the programmable apparatus 10. At a step 118 the bus sizing code 42 directs the microprocessor 22 to configure the bus interface 24 to the bus width. At a step 120 the bus sizing code 42 tests the emulator flag. At a step 122, when the emulator flag is asserted, the bus sizing code 42 passes control to the emulator code 36b. At a step 124, when the emulator flag is not asserted, the checksum code 46 instructs the microprocessor 22 to read data for a checksum and an address space which pertains to the checksum for that address space in the first memory 26 and/or second memory 30 and performs a self-test against the checksum. At a step 126, when the checksum test fails, control is transferred to the monitor code 54. At a step 128, when the checksum test passes, control is passed to the application program code 30b for the intended application in the second memory 30.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A processor for use in booting a programmable apparatus having a signal bus and an apparatus memory coupled to said signal bus, comprising:

a bus interface for connection to said signal bus;

a microprocessor coupled to the bus interface; and a processor memory coupled to the microprocessor, including a code for instructing the microprocessor for reading said apparatus memory including an emulator flag for indicating when said apparatus memory is replaced by an emulator, said emulator including an emulator code; and further including an emulator detect code for instructing the microprocessor for transferring control to said emulator code when said emulator flag indicates that said apparatus memory is replaced by said emulator.

2. The processor of claim 1, wherein:

the processor memory further includes a checksum code for instructing said microprocessor for performing a checksum test of said apparatus memory and for skipping said checksum test when said emulator flag indicates that said apparatus memory is replaced by said emulator.

3. A processor for use in booting a programmable apparatus having a delay flag, a signal bus and an apparatus memory coupled to said signal bus, comprising:

a bus interface for connection to said signal bus;

a microprocessor coupled to the bus interface and said delay flag;

a processor memory, coupled to the microprocessor, for instructing the microprocessor for reading from said apparatus memory including an application program code; and the processor memory including a delay code for instructing the microprocessor for reading said delay flag and for delaying a transfer of control of the microprocessor to said application program code when said delay flag is asserted.

4. A processor for use in booting a programmable apparatus having a monitor flag, a signal bus and an apparatus memory coupled to the signal bus comprising:

a bus interface for connection to said signal bus, a microprocessor coupled to the bus interface and said monitor flag;

a processor memory, coupled to the microprocessor, for instructing the microprocessor for reading from said apparatus memory including a monitor code for enabling a user to read from said apparatus memory; and the processor memory including a monitor request code for instructing the microprocessor for transferring control of the microprocessor to said monitor code when said monitor flag is asserted.

5. A processor, for use in booting a programmable apparatus having a signal bus and an apparatus memory coupled to said signal bus, comprising:

a configurable bus interface for connection to said signal bus, said signal bus having a selectable bus width;

a microprocessor coupled to the bus interface; and a processor memory coupled to the microprocessor, including a bus sizing code for instructing the microprocessor for reading said apparatus memory including initial data for configuring said bus interface to said selectable bus width where said initial data indicates which said selectable bus width has been selected, wherein the bus interface, the microprocessor, and the processor memory are integrated into a single integrated package.

6. A processor for use in booting a global positioning system (GPS) receiver having a signal bus and an apparatus memory coupled to said signal bus, comprising:

a configurable bus interface for connection to said signal bus, said signal bus having a selectable bus width;

a microprocessor coupled to the bus interface; and a processor memory, coupled to the microprocessor, including a bus sizing code for instructing the microprocessor for reading said apparatus memory including initial data for configuring said bus interface to said selectable bus width where said initial data indicates which said selectable bus width has been selected.

7. A method in a processor for boot-up of a programmable apparatus having an apparatus memory coupled to a signal bus, comprising steps of:

connecting said processor to said signal bus, providing an emulator for replacing said apparatus memory;

providing an emulator flag;

reading said emulator flag with said processor; and transferring control of said processor to an emulator code in said apparatus memory when said emulator flag indicates that said apparatus memory is replaced by said emulator.

8. The method of claim 7, further including a step of:

testing said apparatus memory for a checksum when said emulator flag indicates that said apparatus memory is not replaced by an emulator and skipping said testing for said checksum when said emulator flag indicates that said apparatus memory is not replaced by an emulator.

9. A method in a processor for boot-up of a programmable apparatus having a delay flag, a signal bus, and an apparatus memory including initial data having information for said boot up coupled to said signal bus, comprising steps of:

coupling said processor to said signal bus and said delay flag;

reading said delay flag with said processor;

delaying reading of said initial data for completion of said boot-up when said delay flag is asserted; and reading said initial data with said processor after said delay flag is unasserted.

10. A method in a processor for boot-up of a programmable apparatus having a monitor request flag, a signal bus and an apparatus memory including an application program code and a monitor code coupled to said signal bus, comprising steps of:

coupling said processor to said signal bus and said monitor request flag;

reading said monitor request flag;

transferring control of said processor to said monitor code when said monitor request flag is asserted; and operating said processor according to said application program code when said monitor request flag is unasserted.

11. A method in a processor for boot-up of a global positioning system (GPS) receiver having an apparatus memory having initial data coupled to a signal bus having a selected one of at least two possible bus widths, comprising steps of:

programming said initial data for indicating said selected bus width;

coupling said processor to said signal bus;

reading said initial data with said processor over said signal bus; and configuring said processor to said selected bus width based upon said initial data.

\* \* \* \* \*